2,989,417
HARDENING OF GELATIN WITH TITANIUM COMPOUNDS

Joseph De Witt Overman, Eatontown, N.J., assignor to E. I. du Pont de Nemours and Company, Wilmington, Del., a corporation of Delaware
No Drawing. Filed Dec. 24, 1958, Ser. No. 782,631
9 Claims. (Cl. 117—34)

This invention relates to the hardening of gelatin and particularly it relates to the hardening of gelatin containing compositions for use in photographic or related elements. Still more particularly it relates to photograpic gelatin aqueous dispersions and aqueous gelatino-silver halide emulsions containing water-soluble organo-titanium compounds as protein hardening agents.

It is common practice to treat gelatin dispersions and gelatino-silver halide emulsions by incorporating a hardening agent prior to coating in order to reduce the tendency of the gelatin to melt or swell during processing of exposed photographic films, particularly at high temperatures. A variety of compounds have been suggested for this purpose. For example, metal compounds, e.g., salts or oxides of chromium, aluminum, zirconium and titanium; aldehydes, e.g., formaldehyde, hydroxy, aldehydes, acrolein, glyoxal and derivatives thereof; ketones, including diketones, have been proposed as gelatin hardeners. It has also been proposed to use bis-esters of methane sulfonic acid and polyacid anhydrides. Although aldehydes and ketones are used commercially to harden gelatin layers they are somewhat detrimental in photographic systems because they often cause "after-hardening" and undesirable sensitometric characteristics, i.e., fog, loss of speed, lower contrast, etc. Inorganic compounds of certain metals such as chromium, aluminum and titanium are objectionable because their hardening effect on gelatin is quite sensitive to the pH of the gelatin system and to changes in pH of the system. Titanium salts, i.e., titanium nitrate, are effective in a pH range so low as to be useless in a silver halide emulsion system. At higher pH ranges, i.e., 5 to 8, inorganic titanium compounds are quite water-insoluble and hence ineffective as hardeners in aqueous systems. Organic esters of titanium, i.e., tetraisopropyl titanate hydrolyze very readily in aqeous systems and, therefore, cannot be used in aqueous gelatin dispersions.

An object of this invention is to provide an improved process for hardening aqueous solutions or dispersions of gelatin. A related object is to provide a process for hardening light-sensitive gelatino-silver halide emulsions which does not produce undesirable effects on the sensitometric characteristics of such emulsions. Another object is to provide such processes which utilize water-soluble compounds and which can be readily controlled to produce the desired degree of hardening action. A further object is to produce gelatin-containing compositions and layers embodying or hardened with water-soluble organic reaction products of an orthotitanate with a saturated aliphatic carboxylic acid of 2–6 carbon atoms having a hydroxyl group in the alpha-position to the carboxyl group, A still further object is to provide a new means for hardening aqeous gelatin solutions for layers in photographic elements. Still other objects will be apparent from the following description of the invention.

It has been found according to this invention that aqeous gelatin-containing solutions which may have dispersed therethrough light-sensitive materials, e.g., silver halide, antihalation dyes, pigments, colloidal silver, light-filter dyes can be hardened by incorporating with such solutions from about 1 to about 40% by weight, based on the weight of the gelatin, of a water-soluble organic titanium complex reaction product of one mole of an orthotitanate of the general formula $Ti(OR)_4$, where R is an alkyl radical of 1 to 8 carbon atoms, with ½ to 4 mols of a saturated aliphatic monocarboxylic, dicarboxylic or tricarboxylic acid of 2 to 6 carbon atoms having a hydroxyl group in the alpha-position to any carboxylic acid group thereof. The reaction may be carried out advantageously at a temperature between 15° C. and 60° C., but is preferably carried out at room temperature. When the reactants are liquids, no solvents or diluents are necessary. However, it is preferred to use solvents for the reactants which are non-solvents for, and inert with respect to, the reaction products. Suitable solvents include acetone, diethyl ether, etc.

The reaction takes place rapidly and the product precipitates immediately. The precipitated product can be filtered and washed with a suitable solvent and then dried.

The organic titanium compounds or complexes used in accordance with this invention are white, amorphous substances which are quite soluble in water and in aqueous methanol, ethanol and other water-soluble alcohols. The analyses of these substances indicate that they contain alkyl groups from the tetraalkyl titanates, as well as residues from the hydroxyl-substituted acids. They are polymeric substances, i.e., they contain more than one atom of titanium per molecule. Their structure is not known, but due to the hexa-covalency of titanium are believed to be complex condensation products. The products are soluble in water to the extent of 500 to 600 grams per liter of solution. They are also soluble in acid solutions of pH 4 to 7 and in basic solutions of pH 7 to 8, to about the same extent and are stable within these pH ranges. These organic titanium complexes and methods for preparing them are described in British Patent specification No. 757,190 and in assignee's corresponding U.S. application Ser. No. 411,020 of Feb. 17, 1954 (Shacklett), U.S. Patent 2,870,181, Jan. 20, 1959. In hardening gelatin layers, including gelatino-silver halide emulsion layers of photographic films, plates and papers, it is not necessary that the organic titanium complex be added directly to the gelatin-containing solution which it is desired to harden. Instead, the complex can be incorporated with an aqueous water-permeable organic colloid coating solution used for applying a sublayer or an overcoating, e.g., light-filter layer or anti-abrasion or protective layer, adjacent a gelatino silver halide emulsion layer. Due to the substantial degree of water-solubility, the water-soluble titanium compounds can migrate from the applied layer to the layer desired to be hardened. The compounds are conveniently added from aqueous solution having a concentration from 5 to 10% to the molten or liquefied emulsion or dispersion just prior to coating. The aqueous solution may contain from 1 to 10% by weight of gelatin. In gelatin solutions free from silver halide, larger amounts of the titanium compound can be used, e.g., up to about 70 grams per gram of gelatin.

The fact that these titanyl complexes will harden gelatin in the usual pH range at which photographic emulsions are coated, i.e. 5–8, is quite surprising because it was heretofore thought that titanium compounds would only gel or harden gelatin at a relatively low pH, for instance a pH of about 2.3. Still more surprising is the fact that when such compounds are added to the gelatino-silver halide emulsions in quantities to give the above improvements there is no detrimental effect on the speed or contrast of the coated emulsion layer. The titanium complexes will not only successfully harden gelatino-silver halide emulsions but will reduce several types of fog including inherent fog, tropical aging fog and aerial fog arising during processing.

The invention will be further illustrated by but is not intended to be limited to the following examples wherein the photographic emulsions were coated and stored in the absence of significant light until exposed in use.

*Example I*

A high-speed ammonia type gelatino-silver iodo-bromide emulsion having a ratio of gelatin to silver halide of 1.27 by weight and containing about 1.6 mol percent silver iodide, the remainder being silver bromide, was ripened and washed with water in the usual manner, and then digested with an organic sulfur sensitizing compound and gold chloride. After digestion, the fluid aqueous emulsion, ready for coating, was divided into four portions. To three portions there was added the water-soluble reaction product of tetraisopropyl titanate and lactic acid described in Example I of British specification 757,190. The amounts added to each of the three portions are shown in the following table. The emulsion was then coated on a cellulose derivative film support in an amount of 127 mg./dm.$^2$ based on weight of dry gelatin and dried in the conventional manner. The fourth portion was used as a control.

The coatings were exposed to an X-ray radiation (simulated chest exposure) of 75 k.v.p., 150 ma. for $\frac{1}{10}$ sec. at a distance of 55 inches with an X-ray intensification screen adjacent thereto. The coatings were then developed for 5 minutes at 68° F. in a developer of the following composition:

|  | Grams |
|---|---|
| p-N-methylaminophenol hydrosulfate | 3 |
| Sodium sulfate (anhydrous) | 50 |
| Hydroquinone | 9 |
| Sodium carbonate (anhydrous) | 50 |
| Potassium bromide | 4.5 |
| Water to make 1.0 liter. | |

Following development, the films were fixed, washed and dried in the conventional manner. The table below sets forth the melting point and fog data. Fog data are given both for freshly coated samples and samples stored for 1 week at 120° C. and 65% relative humidity (representing tropical aging conditions). The melting point is determined by immersing a strip of the coated film in a water bath and slowly raising the temperature of the bath until the emulsion is observed to melt. The fog was determined in a conventional manner.

|  | Percent titanium compound based on weight of dry gelatin | Melting Point, ° C. | Fresh Fog | Tropical Fog |
|---|---|---|---|---|
| 1 (Control) | 0 | 33 | .18 | 1.12 |
| 2 | 3.5 | 38 | .11 | .34 |
| 3 | 7.0 | 39 | .11 | .35 |
| 4 | 10.5 | 40 | .11 | .54 |

*Example II*

An emulsion was made in the same manner as set forth in Example I. The emulsion was divided into 5 portions. One portion was used as a control and contained no hardening agents and to each of the remaining portions there was added the amount indicated in the following table of the organic titanium compound used in Example I. The emulsion was coated, dried, and tested for fresh fog and melting point in the manner described in that example. The samples were also tested for aerial development fog as follows:

Unexposed strips were developed in the developer set forth in Example I by moving part of the strip in and out of the developer at one-second intervals during a 5-minute period at 68° F. After fixing, washing and drying the samples, the fog is measured on both parts, i.e., $D_A$ on the intermittently immersed part and $D_B$ on the constantly immersed part. The aerial fog $\Delta D$ is then $\Delta D = D_A - D_B$. The term $\Delta D\%$ shown in the tables is the relative $\Delta D$ value of the sample vs. a simultaneously developed standard sample and a control sample without any hardener which is taken as 100%.

|  | Percent titanium compound based on weight of dry gelatin | Melting Point, ° C. | Fresh Fog | $\Delta D\%$ |
|---|---|---|---|---|
| 1 (Standard) | 0 | 47 | .09 | 100 |
| 2 (Control) | 0 | 33 | .14 | 88 |
| 3 | 3.5 | 38 | .11 | 21 |
| 4 | 7.0 | 42 | .13 | 10 |
| 5 | 10.5 | 50 | .11 | 2 |
| 6 | 13.9 | 59 | .13 | 2 |

*Example III*

An emulsion was made and treated in the manner described in Example I. The emulsion was divided into five portions with one portion used as a control and containing no hardening agents. To the other four there was added the quantities of the organic titanium compound of Example I as indicated in the following table. The emulsions were coated, dried, exposed and developed in the manner described in Example I. The fresh and tropical aging results obtained as in Example II and also aerial fog results are shown in the following table.

|  | Percent titanium compound based on weight of dry gelatin | Fresh Fog | Tropical Aging Fog | $\Delta D\%$ |
|---|---|---|---|---|
| 1 (Standard) | 0 | .09 | .15 | 100 |
| 2 (Control) | 0 | .14 | .11 | 108 |
| 3 | 1.4 | .09 | .06 | 42 |
| 4 | 1.8 | .09 | .07 | 22 |
| 5 | 2.8 | .12 | .08 | 15 |
| 6 | 3.5 | .12 | .09 | 7 |

*Example IV*

A gelatin silver iodobromide emulsion made in the manner described in Example I was coated on a suitable support in an amount of 130 mg./dm.$^2$ based on the weight of dry gelatin. The coated film was divided into three segments. Each segment was overcoated with a gelatin overcoating in an amount to give 10 mg./dm.$^2$ based on the weight of dry gelatin. The gelatin solutions for overcoating contained the titanium compound of Example I. Evaluation as in Example I gave the following data:

|  | Grams of titanium lactate compound/gram of gelatin in overcoating formulation | Melting Point ° C. | Fresh Fog |
|---|---|---|---|
| 1 (Control) | 0 | 34 | .13 |
| 2 | 35 | 42 | .11 |
| 3 | 70 | 59 | .11 |

*Example V*

A gelatino-silver iodobromide emulsion was made as in Example I and divided into two portions. One portion containing no hardeners was coated on a suitable support and then overcoated with a gelatin solution to give a coating weight of 10 mg./dm.$^2$ based on the weight of the gelatin. The overcoating solution contained 1.4 grams of dimethylol urea per 100 grams of gelatin. To the other portion of emulsion there was added 39% based on the weight of the gelatin of the titanium lactate compound described in Example I. The emulsion was overcoated with the same overcoating solution as the first portion with the following results:

|  | Percent titanium complex based on weight of dry gelatin | Melting Point, ° C. |
|---|---|---|
| 1 (Control) | 0 | 42 |
| 2 | 39 | 100 |

Example VI

A gelatin-silver iodobromide emulsion was made as described in Example I and divided into two portions. One portion was used as a control and contained no hardening agents. To the second portion there was added the quantity indicated in the table of the reaction product of tetraisopropyl titanate and alpha-hydroxy isobutyric acid. The titanium compound was made by reacting 285 parts of tetraisopropyl titanate with 180 parts of alpha-hydroxy isobutyric acid in an acetone medium as described in British patent specification 757,190. The resulting precipitate was filtered and a 5% aqueous solution was used to add to the emulsion.

|  | Percent titanium complex based on weight of dry gelatin | Melting Point, ° C. | Fresh Fog |
| --- | --- | --- | --- |
| 1 (Control) | 0 | 32 | .42 |
| 2 | 6.4 | 35 | .17 |

Although the above examples disclose addition of the titanium compounds to ammonia-type gelatin silver iodobromide emulsions, the invention is not limited thereto. The titanium compounds are equally effective in acid type emulsions. Other titanium compounds may be used in place of those disclosed above, including those described in the above-mentioned British specification and Shacklett application. For example, organotitanium compounds made by reacting glycolic acid, tartaric acid, glyceric acid and citric acid with tetramethyl, tetraethyl, tetrapropyl, tetrabutyl, tetraamyl, tetrahexyl, tetraheptyl, and tetraoctyl titanates and tetra(2-ethylhexyl)titanate can be used. The titanium compound is, of course, efficacious in hardening auxiliary gelatin layers such as backing layers, antihalation layers, filter layers and separation layers. Various light-sensitive silver halides other than that described in the examples may be present in the gelatin, e.g., silver chloride, silver bromide, and silver chloride-bromide-iodide.

The organo titanium compounds may also be used to harden other light-sensitive gelatin layers, e.g., diazo layers.

The gelatin layers may be coated on any conventional support, e.g., cellulose acetate, cellulose acetate/butyrate, polyvinyl chloride; polyesters, e.g., those described in Alles et al. 2,627,088, British patent specification 766,290 and Canadian Patent 562,672; and zinc, copper or aluminum plates or foils.

As indicated by the examples, the quantity which may be added to a gelatin-silver halide emulsion or a gelatin dispersion may be varied over a wide range to give good hardening without serious deleterious effect. The organo titanium compounds have a high degree of stability in aqueous systems and may be added to gelatin dispersions and gelatin-silver halide emulsions over a wide range of pH, i.e., 4–9. The novel hardening agents are unaffected by the temperatures which are usually encountered in the various operations using gelatin systems.

One outstanding advantage in adding the reaction products of orthotitanates and alpha-hydroxy acids to light-sensitive gelatin-silver halide emulsions is the diminution of aerial fog during the usual processing of the exposed layers.

What is claimed is:

1. A process for hardening gelatin compositions containing water which comprises admixing therewith about 1% to about 40% by weight based on the gelatin of a water-soluble organo-titanium compound comprising the reaction product of one mol of an orthotitanate of the formula $Ti(OR)_4$ wherein R is an alkyl radical of 1 to 8 carbon atoms, with ½ to 4 mols of a saturated aliphatic carboxylic acid of 2 to 6 carbon atoms containing only carbon, hydrogen and oxygen atoms and having a hydroxyl group in the alpha-position thereof, said compound being soluble in water to the extent of at least 500 grams per liter of solution.

2. A process as set forth in claim 1 wherein said compound is the reaction product of tetraisopropyl titanate and lactic acid.

3. A process as set forth in claim 1 wherein the admixture is coated onto a support.

4. A process as set forth in claim 1 wherein the aqueous gelatin composition contains dispersed silver halide grains.

5. A process as set forth in claim 1 wherein an aqueous gelatin solution containing the titanium compound is coated onto a support and dried, and a gelatino-silver halide layer is coated onto the gelatin sublayer.

6. An aqueous gelatin-containing composition having admixed therewith from 1 to 15% by weight based on the gelatin of a water-soluble organo-titanium compound comprising the reaction product of one mol of an orthotitanate of the formula $Ti(OR)_4$ wherein R is an alkyl radical of 1 to 8 carbon atoms, with ½ to 4 mols of a saturated aliphatic carboxylic acid of 2 to 6 carbon atoms containing only carbon, hydrogen and oxygen atoms and having a hydroxyl group in the alpha-position thereof, said compound being soluble in water to the extent of at least 500 grams per liter of solution.

7. A composition as defined in claim 6 wherein said compound is the reaction product of tetraisopropyltitanate and lactic acid.

8. A process for hardening a gelatino silver halide emulsion layer on a support which comprises applying to the outer surface of the layer a coating of aqueous gelatin containing about 1% to about 40% by weight based on a gelatin of a water-soluble organo-titanium compound comprising the reaction product of one mol of an orthotitanate of the formula $Ti(OR)_4$ wherein R is an alkyl radical of 1 to 8 carbon atoms, with ½ to 4 mols of a saturated aliphatic carboxylic acid of 2 to 6 carbon atoms containing only carbon, hydrogen and oxygen atoms and having a hydroxyl group in the alpha-position thereof and drying the coating.

9. A process as defined in claim 8 wherein said compound is the water-soluble reaction product of tetraisopropyltitanate and lactic acid.

References Cited in the file of this patent

UNITED STATES PATENTS 2,870,181    Shacklett    Jan. 20, 1959

FOREIGN PATENTS 757,190    Great Britain    Sept. 12, 1956